(12) United States Patent
Jagathesan et al.

(10) Patent No.: US 7,716,388 B2
(45) Date of Patent: May 11, 2010

(54) COMMAND RE-ORDERING IN HUB INTERFACE UNIT BASED ON PRIORITY

(75) Inventors: Shoban Srikrishna Jagathesan, Murphy, TX (US); Sanjive Agarwala, Richardson, TX (US); Kyle Castille, Houston, TX (US); Quang-Dieu An, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 830 days.

(21) Appl. No.: 11/128,568

(22) Filed: May 13, 2005

(65) Prior Publication Data

US 2006/0259568 A1    Nov. 16, 2006

(51) Int. Cl.
  *G06F 13/28* (2006.01)
  *G06F 15/167* (2006.01)
(52) U.S. Cl. .................................. 710/22; 709/212
(58) Field of Classification Search .............. 710/22
  See application file for complete search history.

(56) References Cited

U.S. PATENT DOCUMENTS

| 6,141,692 | A | 10/2000 | Loewenstein et al. | |
|---|---|---|---|---|
| 6,145,016 | A * | 11/2000 | Lai et al. | 710/4 |
| 6,557,052 | B1 * | 4/2003 | Kubo | 710/23 |
| 6,574,683 | B1 * | 6/2003 | Comisky et al. | 710/23 |
| 6,594,713 | B1 * | 7/2003 | Fuoco et al. | 710/31 |
| 6,681,270 | B1 * | 1/2004 | Agarwala et al. | 710/40 |
| 6,904,474 | B1 * | 6/2005 | Robertson | 710/33 |
| 7,047,374 | B2 * | 5/2006 | Sah et al. | 711/158 |
| 7,249,236 | B2 * | 7/2007 | Jeddeloh et al. | 711/169 |
| 7,450,588 | B2 * | 11/2008 | Chang et al. | 370/394 |
| 2002/0013821 | A1 | 1/2002 | Kasper et al. | |
| 2005/0078694 | A1 | 4/2005 | Oner et al. | |
| 2005/0160188 | A1 * | 7/2005 | Bogin et al. | 710/1 |
| 2006/0195663 | A1 * | 8/2006 | Arndt et al. | 711/153 |

\* cited by examiner

*Primary Examiner*—Henry W. H. Tsai
*Assistant Examiner*—Michael Sun
(74) *Attorney, Agent, or Firm*—Robert D. Marshall, Jr.; W. James Brady; Frederick J. Telecky, Jr.

(57) ABSTRACT

Command reordering in the hub interface unit (HIU) of Enhanced Direct Memory Access (EDMA) functions is described. Without command reordering in the EDMA, commands are issued by the HIU to the peripheral in order of issue. If the higher priority transfers are issued later by the EDMA, the previously issued lower priority transfers would block the higher priority transfers. Command reordering in the HIU causes transfers to be reordered and issued to the peripheral based on their priority. Reordering allows the EDMA and HIU to give due service to high priority transfer requests with decreased weight placed on the order in which the requests were issued.

7 Claims, 7 Drawing Sheets

| | ORIGINAL COMMAND QUEUE | | | | | | | RE-ORDERED COMMAND QUEUE | | | | | | | COMMAND QUEUE AFTER HIU READ | | | | | | |
|---|---|---|---|---|---|---|---|---|---|---|---|---|---|---|---|---|---|---|---|---|---|
| HIU TO AU W2 | | | | | | | | | | | | | | | R2 | 2R2 | R3 | 2R3 | | | 719 |
| AU R1 FROM HIU | | | | | | | | | | | | | | | W2 | R2 | 2R2 | R3 | 2R3 | | 718 |
| TC R1 TO HIU AU R0 FROM HIU | R0 | W2 | R2 | 2R2 | R3 | 2R3 | R1 | R0 | R1 | W2 | R2 | 2R2 | R3 | 2R3 | R1 | W2 | R2 | 2R2 | R2 | 2R3 | 717 |
| | | | | | | | | | | | | | | | | | | | | | 716 |
| | | | | | | | | | | | | | | | | | | | | | 715 |
| TC R0 AND W0 TO HIU | W2 | R2 | 2R2 | R3 | R0 | W0 | | R0 | W2 | R2 | 2R2 | R3 | 2R3 | | R0 | W2 | R2 | 2R2 | R3 | 2R3 | 714 |
| | | | | | | | | | | | | | | | | | | | | | 713 |
| TC R2 TO HIU | W2 | R2 | R3 | 2R3 | 2R2 | | | W2 | R2 | 2R2 | R3 | 2R3 | | | | | | | | | 712 |
| TC R1 TO HIU AU R1 FROM HIU | W2 | R2 | R3 | 2R3 | R1 | | | R1 | W2 | R2 | R3 | 2R3 | | | W2 | R2 | R3 | 2R3 | | | 711 |
| | | | | | | | | | | | | | | | | | | | | | 710 |
| HIU TO AU W1 | | | | | | | | | | | | | | | W2 | R2 | R3 | 2R3 | | | 709 |
| | | | | | | | | | | | | | | | | | | | | | 708 |
| TC R3 TO HIU | W1 | W2 | R2 | R3 | 2R3 | | | W1 | W2 | R2 | R3 | 2R3 | | | | | | | | | 707 |
| | | | | | | | | | | | | | | | | | | | | | 706 |
| TC W1 AND R3 TO HIU | W2 | R2 | R3 | W1 | | | | W1 | W2 | R2 | R3 | | | | | | | | | | 705 |
| AU R0 FROM HIU | | | | | | | | | | | | | | | W2 | R2 | | | | | 704 |
| TC R0 TO HIU | W2 | R2 | R0 | | | | | R0 | W2 | R2 | | | | | | | | | | | 703 |
| TC W2 TO HIU | R2 | W2 | | | | | | W2 | R2 | | | | | | | | | | | | 702 |
| TC R2 TO HIU | R2 | | | | | | | R2 | | | | | | | | | | | | | 701 |

FIG. 7

COMMAND RE-ORDERING IN HUB INTERFACE UNIT BASED ON PRIORITY

TECHNICAL FIELD OF THE INVENTION

The technical field of this invention is command re-ordering in data transfer.

BACKGROUND OF THE INVENTION

Current microprocessor designs have emphasized the need to centralize data transfer operations under control of integrated functional units that have been variously called data transfer controllers or enhanced direct memory access (EDMA). This application concerns EDMA designs employing a hub-and-port style architecture. Such EDMAs feature a hub unit, which maintains a queue of transfer requests and provides priority protocol and proper interfacing for the handling of a large number of such requests. Secondly, hub-and-port EDMAs have one or more hub interface units (HIU), each providing a seamless interface between the EDMA hub and its ports. These ports include application units (AU) peripherals.

FIG. 1 illustrates the essentials of a prior art microprocessor system having a CPU 101 and a transfer controller 102 as part of an EDMA 103. The transfer controller 102 is connected to one or more hub-interface-units (HIU) 104, 105, and 106. HIUs 104, 105 and 106 are connected to a plurality of several varieties of application-unit-interface (AUI) functions blocks 107, 108, and 109. A wide variety of application units known more commonly as peripheral units having significant performance ranges and having a variety of functional requirements are shown represented by blocks 117, 118, and 119. Some peripheral units only receive data under control of the EDMA and these have no need to generate data transfer requests. Peripheral unit 117 connected to AU interface 107 is one such peripheral. Other peripheral units, such as PUs 118 and 119, generate and communicate data transfer requests to the transfer controller 102. Inputs 113 and 114 from respective peripheral units 118 and 119 initiate the transfer requests generated in transfer request generator block 111. These transfer requests are passed to the transfer controller 102 via path 112.

SUMMARY OF THE INVENTION

Enhanced Direct Memory Access (EDMA) functions are enjoying increased applications in current microprocessor designs. In the EDMA, the read/write commands are issued by a hub interface unit (HIU) to the peripherals based on the order in which commands come to the HIU from the transfer controller (TC). In current designs, if higher priority transfers are issued later by the TC, the lower priority transfers issued previously block the higher priority transfers from receiving due attention. This is magnified when the EDMA interfaces with a slow peripheral. In the command re-ordering in the HIU of this invention higher priority transfers are re-ordered and issued to the peripheral based on their priority. Re-ordering allows the EDMA and HIU to give due service to high priority transfer requests with decreased weight placed on the order in which the requests were issued to the HIU from the transfer controller.

BRIEF DESCRIPTION OF THE DRAWINGS

These and other aspects of this invention are illustrated in the drawings, in which:

FIG. 7 illustrates the timing diagram and an illustrative example of read/write command reordering sequences from the viewpoint of the Command Queue.

DETAILED DESCRIPTION OF PREFERRED EMBODIMENTS

Figure 2:
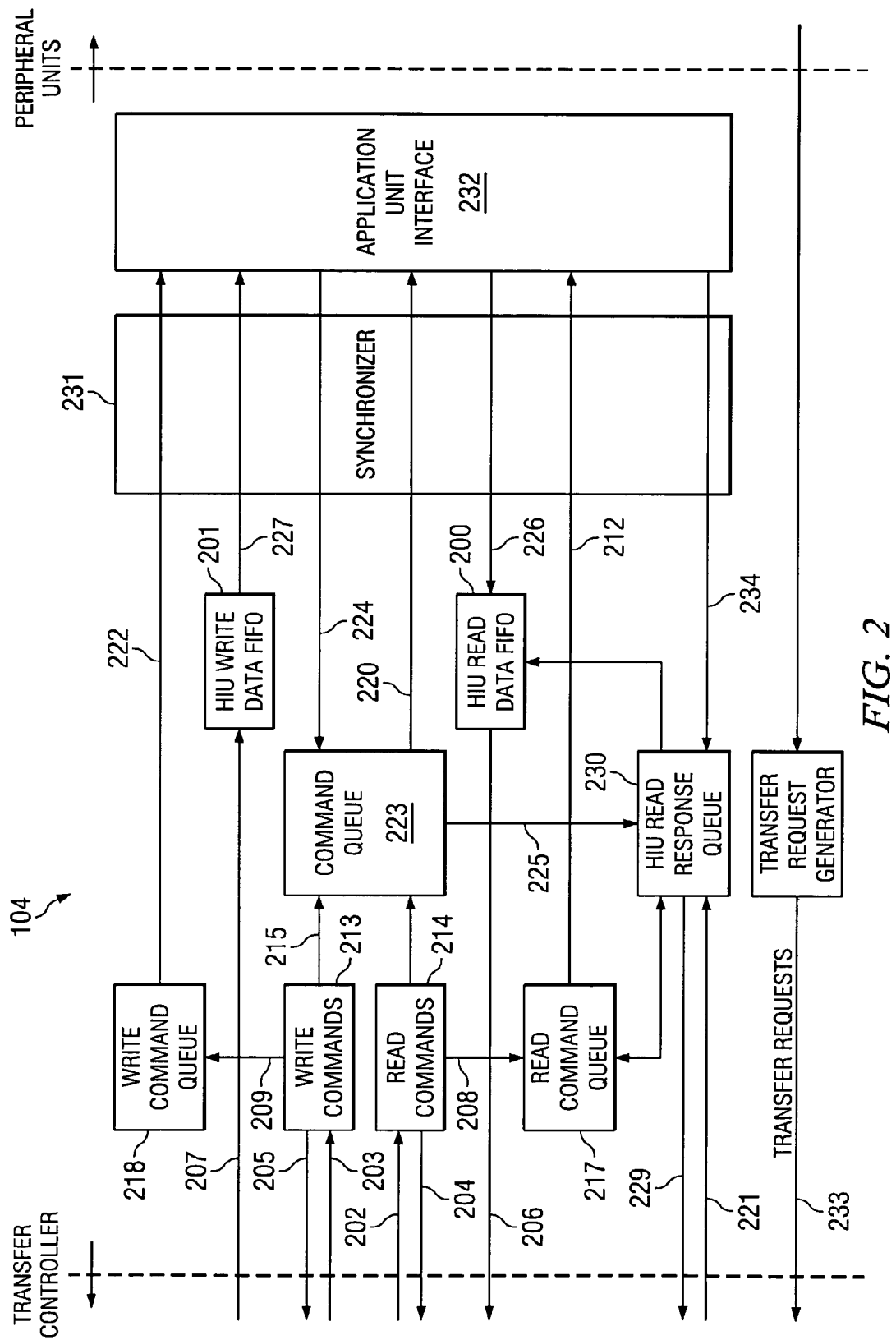
FIG. 2 illustrates the high level functional diagram of a hub interface unit providing interface between the transfer controller and application units.

The hub interface unit of this invention provides improved interface between the transfer controller of an Enhanced DMA (EDMA) and the application unit interfaces (AUI) serving external peripherals. FIG. 2 illustrates a basic high-level functional diagram of hub interface unit 104 providing the interface between transfer controller 102 and peripheral units. HIU 104 includes command queue 223 controlling and synchronizing the read and write command operations and HIU read response queue 230 controlling and synchronizing read information returned from the application unit interface (AUI) 232 back to transfer controller 102. The operational protocol of command queue 223 and read response queue 230 form the heart of the present invention.

HIU 104 receives read commands from transfer controller 102 via input 202 and processes these read commands in read commands block 214. Read command block 214 drives read command queue 217 via path 208. Read command queue 217 stores all read commands issued by transfer controller 102. Data to be read from AUI 232 via path 226 is stored in HIU read data FIFO 200.

HIU 104 receives write commands from transfer controller 102 via input 203 and processes these write commands in write commands block 213. Write command block 213 drives write command queue 218 via path 209. Write command queue 218 stores all write commands issued by transfer controller 102. Data to be written from transfer controller 102 via path 207 to the application unit interface 232 via path 227 is first stored in HIU write data FIFO 201. Synchronizer block 231 performs the timing interface between the HIU and the AUI clock domains.

Table 1 lists the major HIU signals.

TABLE 1

| Signal | Description | Interface |
| --- | --- | --- |
| 202 | Transfer Controller (TC) READ Command | TC-HIU |
| 203 | Transfer Controller (TC) WRITE Command | TC-HIU |
| 204 | TC Read Queue Increment | HIU-TC |
| 205 | TC Write Queue Increment | HIU-TC |
| 206 | HIU to TC read data Out | HIU-TC |
| 207 | TC to HIU write data In | TC-HIU |
| 212 | Read Commands | HIU-AU |
| 220 | Cmd Queue to AUI | HIU-AUI |
| 221 | Read Response Acknowledge | TC-HIU |
| 222 | Write Commands | AUI-AU |
| 224 | Command Acknowledge | AUI-HIU |
| 225 | Cmd Queue to Resp Queue Increment | Within HIU |
| 226 | Read Data | AUI-HIU |
| 227 | Write Data | HIU-AUI |
| 229 | Read Response | HIU-TC |
| 233 | Transfer Requests | Peripheral-TC |
| 234 | AUI to Read Response Queue | AUI-HIU |

This invention provides a means to upgrade HIU designs to fully utilize the priority information that transfer controller 102 supplies when issuing a transfer request. Previously, in a typical HIU, when either a read or the write command is issued to the HIU and passed to the AUI, the peripheral acknowledges the command. After the final command acknowledge the HIU simply switches to the next command regardless of priority.

Operations performed by command queue 223 and read response queue 230 utilize pointers rather than the entire command field. There is a one-to-one correspondence between a pointer and the specific command to which it refers.

With command reordering, the next command that is issued by HIU 104 to the AUI is the command (read or write) that has the highest priority among the remaining commands. Pointer manipulation takes place in HIU 104, both in command queue block 223 and in read response block 230 to issue the transfer with the highest incoming priority and to properly handle the data from a read operation.

Figure 3:
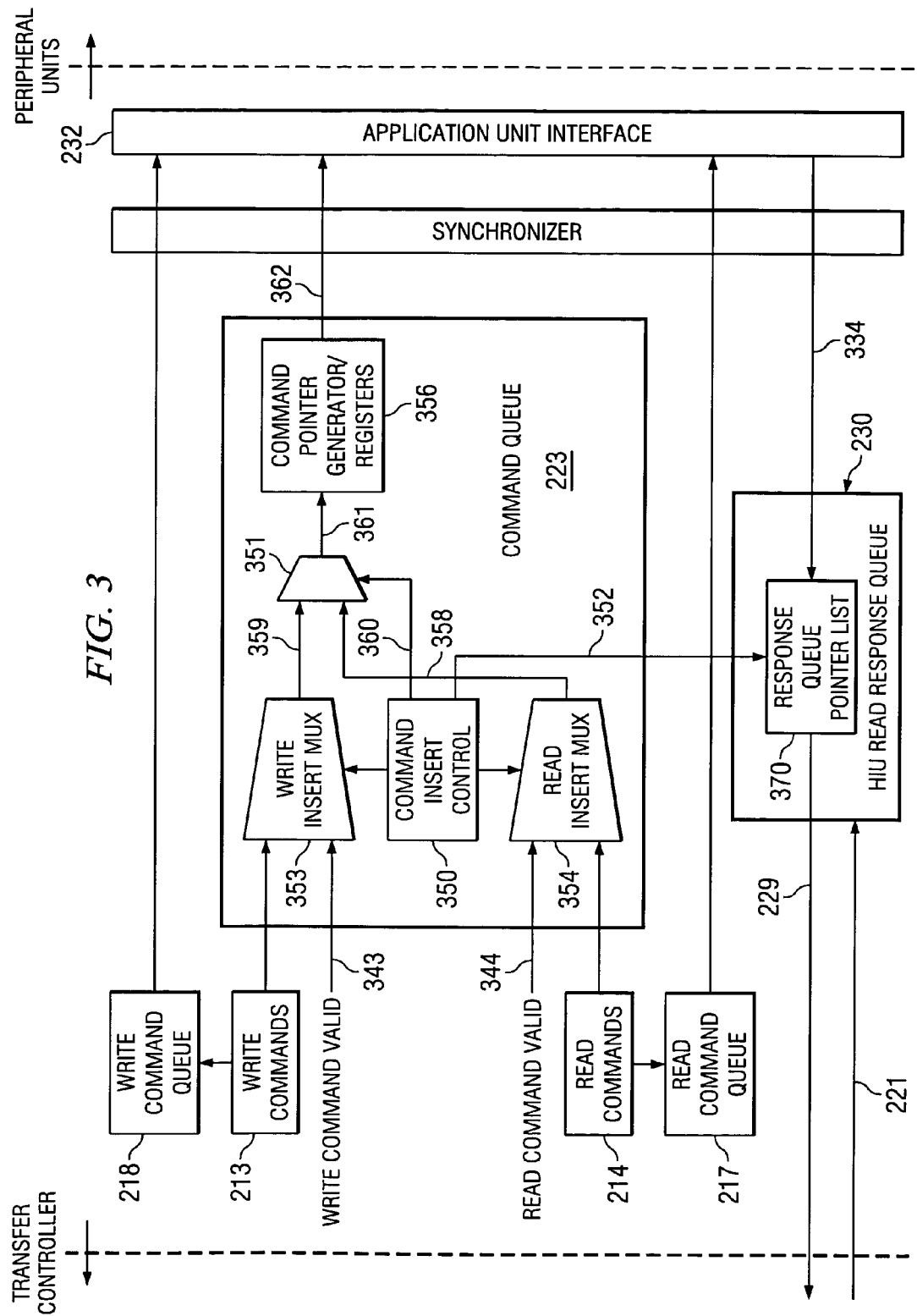
FIG. 3 illustrates a simplified functional diagram of a hub interface unit without command reordering and with data FIFOs and transfer request paths removed and HIU Read Response and Command Queue functions emphasized.
Figure 4:
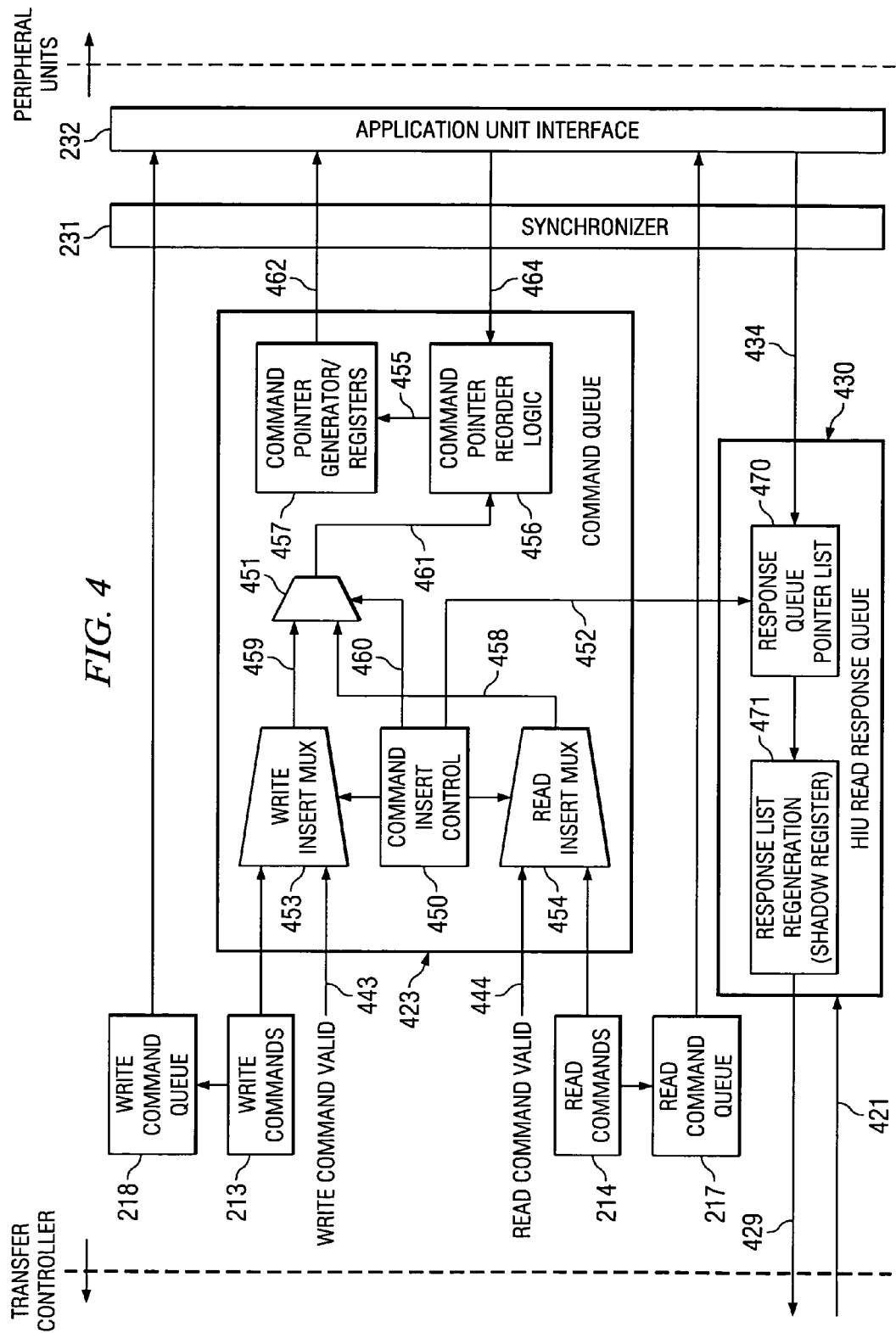
FIG. 4 illustrates a the simplified functional diagram of a hub interface unit including command reordering functionality in the HIU Read Response and Command Queue functions.

FIG. 3 illustrates the implementation of command queue block 223 in the absence of command reordering. FIG. 3 also illustrates response queue pointer list 370 processing in the absence of command reordering. Command insert control block 350 directs the selection of input write commands 213 in write insert multiplexer 353 and directs the selection of input read commands 214 in read insert multiplexer 354. In a given clock cycle one read command or one write command is selected by multiplexer 351 and is passed via line 361 to command pointer generator/register block 356. Signal path 352 informs the response queue pointer list block 370 when any read command has been issued. Command pointers are issued via path 362 for write commands or read commands passing to AUI 232. Write commands may be inserted into the command queue only when write command valid signal 343 is active and read commands may be inserted into the command queue only when read command valid signal 344 is active FIG. 4 illustrates the implementation of command reordering of this invention in command queue block 423 and in HIU read response queue block 430. Command insert control block 450 directs the selection of input write commands by write insert multiplexer 453 and the selection of input read commands by read insert multiplexer 454. In a given clock cycle one read command or one write command is selected by multiplexer 451 and is passed via line 461 to command pointer reorder logic 456. In command pointer reorder logic 456 the command pointers are reordered according to a priority protocol. The reordered pointers are reassembled in command pointer generator/registers block 457. Signal path 452 informs the response queue pointer list block 470 when any read command has been issued. Command pointers are issued via path 462 for write commands or read commands passing to AUI 232. Commands received by AUI 232 are acknowledged via path 464.

Command Reordering for Write Commands

Referring again to FIG. 2, for the write command HIU 104 has write reservation stations which store write data. Each reservation station is devoted to storing the full complement of command data corresponding to one specific write command. Write Command Queue 218 contains reservation station hardware to accomplish the complex housekeeping required of the EDMA. Reservation stations are composed of a number of registers that store, track and control the transfer of data in situations where several data transfers are proceeding at more than one priority level. Hardware for reservation stations tracking and control is included in write command queue 218 and in write command block 213. Hardware for reservation station data storage is provided in HIU write data FIFO 201.

A write command 215 informs HIU 104 the number of words that will be written by the EDMA for that write command. The maximum words that can be written are based on the maximum write burst size for that HIU. Once all the words are written for that write command, HIU 104 puts that write command in write command queue 218. This command will be issued next by write command queue 218 to the peripheral, provided the command issue by EDMA to HIU 104 is complete and this write command has the highest priority among all the commands in the HIU command queue.

Command Reordering for Read Commands

Read command reordering is more complex. In a typical HIU when a read command 202 is sent by transfer controller 102 to the HIU, command 212 is issued to the AUI on a later clock cycle. The peripheral returns read data 226. This read data 226 is stored in HIU read data FIFO 200. HIU read response queue 230 controls sending data back to transfer controller 102. The order in which the data returns to transfer controller 102 is the order in which transfer controller 102 issued the read command to the HIU. However with the command reordering of this invention, the data that is sent back to the HIU based on priority. The order of data returned to transfer controller 102 is the order in which the read command was issued to the AUI. So HIU response queue 230 is modified to accept the data from the peripheral in the order in which the command was issued to the AUI and not in the order in which transfer controller 102 issued the read command. A shadow register is added in the read response queue 230 to allow for buffering and re-issuing read pointers in the re-ordered sequence.

FIG. 4 illustrates command reordering in read response queue 430. Read response queue 430 observes the following rules:

1) Write commands 213 and read commands 214 are issued by the TC to the HIU.

2) For write commands 213, when the reservation station is full, the write command enters write command queue 218.

3) For read commands 214, when there is space in the read response queue 430 to accept the read data (226 of FIG. 2) returned by the AUI, the read command 214 is put in read command queue 217.

4) When the final read/write is issued to the AUI for a particular read/write command and the AUI has issued the final command acknowledge 464, the next command is issued to the AUI. This next command is the command with the highest priority of the remaining commands.

5) If there are read and write commands with the same highest priority, the write command takes precedence and is issued to the peripheral.

6) Within the same priority level, the order of issue from TC 102 is maintained.

Figure 1:
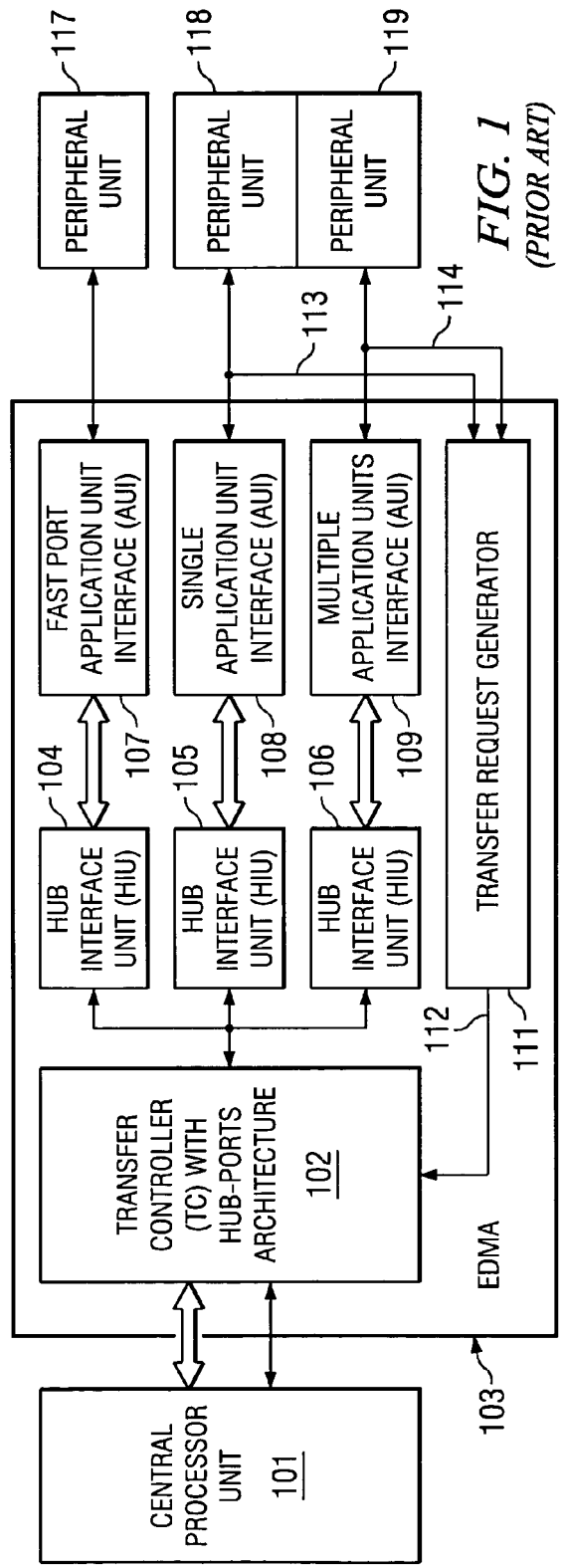
FIG. 1 illustrates the high level functional diagram of an enhanced direct memory access (EDMA) unit including a transfer controller with hub-and-port architecture driven by a central processor unit and interfacing with several application unit interfaces driving peripheral unit functions (Prior Art)
Figure 5:
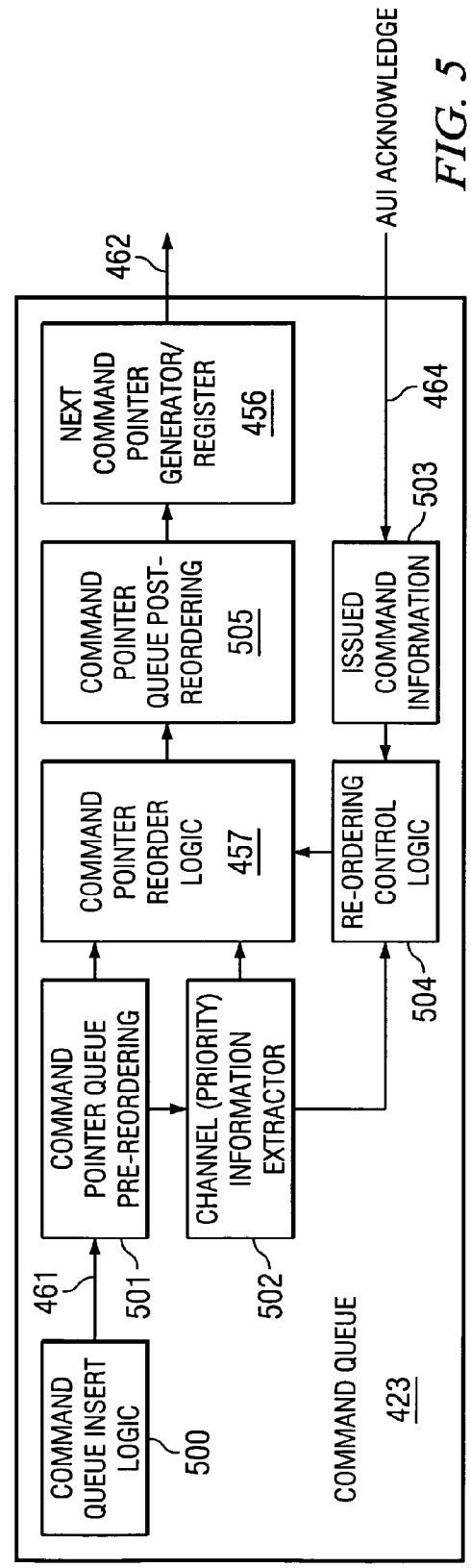
FIG. 5 illustrates the functional diagram of the command queue portion of the hub interface unit of FIG. 4 including command reordering functionality in the command queue function.

FIG. 5 illustrates in greater detail the functional diagram of the command queue 423 of the hub interface unit of FIG. 4 including command reordering in the command queue. Command queue insert logic 500 includes the write insert multiplexer 453, the read insert multiplexer 454, and command select multiplexer 451 of FIG. 4. Inputs from command queue insert logic 500 are passed to command pointer queue pre-reordering 501 with new commands simply inserted at the bottom of the queue irrespective of priority. New commands are passed to the channel (priority) extractor 502, which in turn passes the extracted priority information to the re-ordering control logic 504. Re-ordering control logic 504 also receives issued command information from AUI acknowledge input 464 previously stored in issued command information block 503. The two inputs, issued command information and channel priority information form the basis for control of command pointer reorder logic 457. Command pointer reorder logic 457 sorts all remaining command pointer entries by the prescribed sorting algorithm described in the six rules above. The re-ordered command pointer queue is stored in registers in command queue pointer queue (post reordering) 505. The command queue pointer queue (post reordering) 505 passes the next command pointer to be issued to next command pointer generator/register 456 which passes next pointers to the AUI via path 462.

Figure 6:
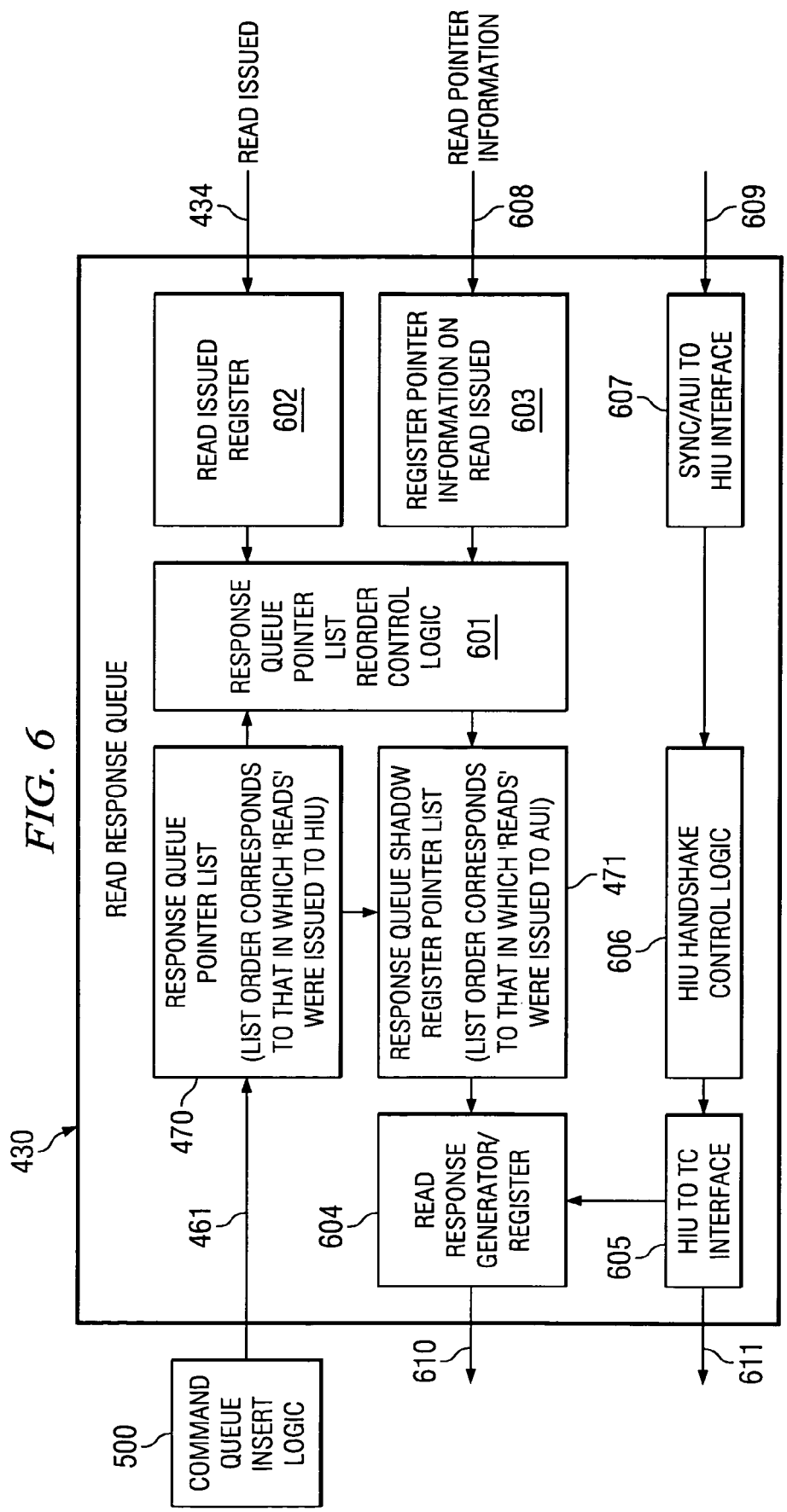
FIG. 6 illustrates the functional diagram of the read response queue portion of the hub interface unit of FIG. 4 including command pointer reordering functionality in the read response queue function.

FIG. 6 illustrates in greater detail the functional diagram of the read response queue 430 of the hub interface unit of FIG. 4. This includes the required response queue re-ordering which takes into account that commands issued to the AUI and hence the read responses are in a different order than received in an non-re-ordered HIU. The original pointer list stored in response queue pointer list 470 receives new commands from command queue insert logic 500. Issued read commands are reported at input 434 from the AUI. On the same clock cycle read pointer information on the issued read command are passed to read response queue 430 via path 608. This read pointer information is stored in register pointer information on read issued block 603 and passes to the response queue pointer list reorder control logic 601. Response queue pointer list reorder control logic 601 drives the transfer of the original pointer information of response queue pointer list 470 to be stored in response queue shadow register pointer list 471. Response queue shadow register pointer list 471 contains the read responses re-ordered to meet the sequence in which the read commands were actually issued to the AUI. Read response generator/register 604 supplies the read responses one per clock cycle in the required order at output 610. Interface blocks 605 and 607 along with handshake logic block 606 are required to execute the proper timing of the read response transfer through the HIU. Input to the handshaking logic path is via line 609 to sync/AUI to HIU interface 607 and output signal from handshaking to the transfer controller is via path 611 from HIU to TC interface 605.

FIG. 7 illustrates an illustrative example of read/write command reordering from the viewpoint of the command queue 223. FIG. 7 illustrates a number of read and write commands entering the HIU. At any given time there can be a TC read command or a TC write command or both. On the peripheral side only one command, a read or a write may be active at a given time. FIG. 7 illustrates the status of the original command queue, the re-ordered command queue and the command queue after HIU read for various time intervals 701 to 719.

At time 701, the transfer controller (TC) issues a read command of priority 2 (R2) to the HIU. Both the command queue and the re-ordered command queue have this single entry R2.

At time 702, the TC issues a write command of priority 2 (W2) to the HIU. The commands are reordered in the re-order command queue so that the priority 2 write command (W2) is placed ahead of the priority 2 read command (R2). This invention gives writes precedence over reads of the same priority.

At time 703, the TC issues a read command of priority 0 (R0) to the HIU at lowest level. This read command R0 has the highest priority. The original command queue maintains commands in order of receipt while the re-ordered command queue reorders commands to the proper priority order R0, W2, R2.

At time 704, no new command enters the HIU Command Queue. HIU issues read command R0 to the application unit (AU). The command queue after HIU read becomes W2, R2.

At time 705, the TC issues both a read of priority 3 (R3) and a write of priority 1 (W1) to the HIU. The commands are re-ordered in the re-ordered command queue to become W1, W2, R2, R3.

No Operations occur at time 706.

At time 707, the TC issues a second read command of priority 3 (2R3) to the HIU. This read command is placed at the bottom of the command list below the R3 command previously entered in step 705. No reordering is required because these last commands are of the same priority and will be handled in order of receipt. At this point the re-ordered command queue is W1, W2, R2, R3, 2R3.

No Operations occur at time 708.

At time 709, the TC issues no new commands to the HIU command Queue. The HIU issues the command W1 to the AU. The command queue after HIU read becomes W2, R2, R3, 2R3.

No Operations occur at time 710.

At time 711, the TC issues a read command of priority 1 (R1) to the HIU. The HIU is simultaneously ready to issue a command and it issues this same R1 command directly to the AU. At this point the command queue priority after read remains: W2, R2, R3, 2R3 as in 709.

At time 712, the TC issues a read command of priority 2 (2R2) to HIU. In the original command queue this command 2R2 is inserted appropriately behind previous entries to become W2, R2, R3, 2R3, 2R2. Upon re-ordering this command is inserted behind the previous priority 2 commands and ahead of the previous priority 3 commands. Thus the re-ordered command queue becomes W2, R2, 2R2, R3, 2R3.

No Operations occur at time 713.

At time 714, the TC simultaneously issues a read of priority 0 (R0) and a write of priority 0 (W0) to the HIU. The re-ordered command queue becomes W0, R0, W2, R2, 2R2, R3, 2R3. Also at time 714, the HIU issues the command W0 directly to the HIU leaving the command queue after HIU read R0, W2, R2, 2R2, R3, 2R3.

No Operations occur during times 715 and 716.

At time 717, the TC issues a read priority 1 (R1) to the HIU. In the re-ordered command queue this R1 command is inserted following the R0 command and before all the priority 2 commands. Thus the re-ordered command queue becomes R0, R1, W2, R2, 2R2, R3, 2R3. Also at time 717, the HIU issues the command R0 directly to the AU and the command queue after HIU read becomes R1, W2, R2, 2R2, R3, 2R3.

At time 718, the HIU issues the command R1 to the AU and the command queue after HIU read becomes W2, R2, 2R2, R3, 2R3.

At time 719, the HIU issues the command W2 to the AU and the command queue after HIU read becomes R2, 2R2, R3, 2R3.

Figure 8:
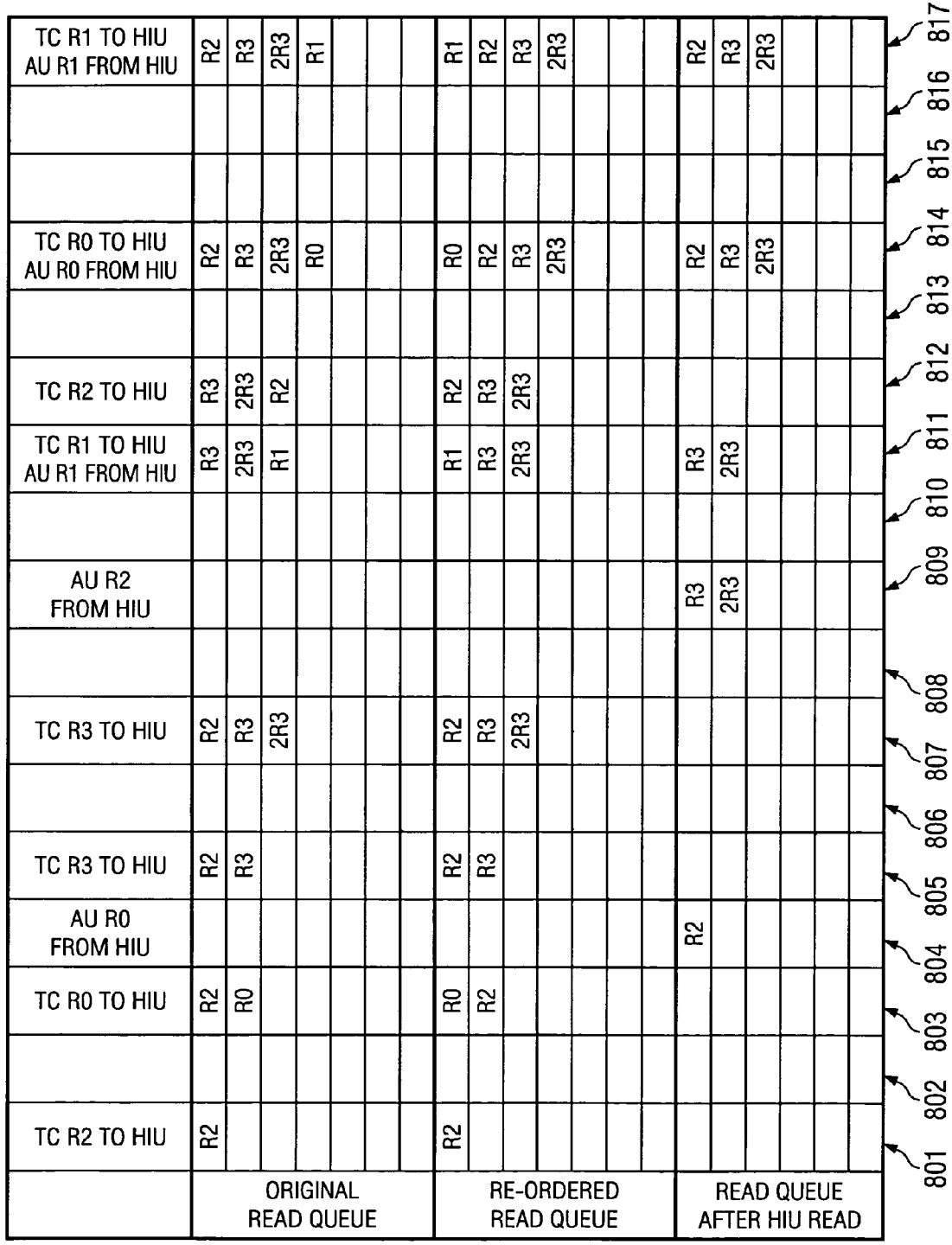
FIG. 8 illustrates the timing diagram and an illustrative example of read/write command reordering sequences from the viewpoint of the HIU Read Response Queue.

FIG. 8 illustrates an example of read command reordering from the viewpoint of the HIU read response queue. A number of read commands entering the HIU are shown. At any given time there can be a TC read command. On the AUI side only one read command may be active at a given time. FIG. 8 illustrates the status of the original command queue, the re-ordered command queue and the command queue after HIU read for various time intervals 801 to 817.

At time 801, the TC issues a read command of priority 2 (R2) to the HIU.

No Operations occur at time 802.

At time 803, the TC issues a read command of priority 0 (R0) to the HIU. The original command queue is R2, R0. The commands are reordered so that the priority 0 read (R0) is placed ahead of the priority 2 read (R2) and the re-ordered read queue becomes R0, R2.

At time 804, the HIU issues the priority read command R0 to the AU. The read queue after HIU read becomes R2.

At time 805, the TC issues a read command of priority 3 (R3) to the HIU. The original read command queue becomes R2, R3. These commands are already in priority order so the re-ordered read queue is also R2, R3.

No operations occur at time 806.

At time 807, the TC issues another read command of priority 3 (2R3) to the HIU. The original read command queue becomes R2, R3, 2R3. These commands are already in priority order so the re-ordered read queue is also R2, R3, 2R3.

No Operations occur at time 808.

At time 809, the HIU issues the priority 2 read command (R2) to the AU. Read queue after HIU read becomes R3, 2R3.

No Operations occur at time 810.

At time 811, the TC issues a read command priority 1 (R1) to the HIU. Also at time 811, the HIU issues this read command (R1) directly to the AU. The read queue after HIU read becomes R3, 2R3.

At time 812, the TC issues a read command of priority 2 (R2) to the HIU. The original read queue is R3, 2R3, R2. The priority 2 read command R2 is advanced before the other commands and the re-ordered read queue becomes R2, R3, 2R3.

No Operations occur at time 813.

At time 814, the TC issues a read command of priority 0 (R0) to the HIU. Also at time 814, the HIU issues this read command (R0) directly to the AU. In the re-ordered read queue the read command R0 advances to the head of the queue and becomes R0, R2, R3, 2R3. The read queue after HIU read becomes R2, R3, 2R3.

No Operations occur at times 815 and 816.

At time 817, the TC issues a read command of priority 1 (R1) to the HIU. Also at time 817, the HIU issues this read command (R1) directly to the AU. In the re-ordered read queue the read command R1 advances to the head of the queue and becomes R1, R2, R3, 2R3. The read queue after HIU read becomes R2, R3, 2R3.

What is claimed is:

1. A direct memory access apparatus comprising:
   a hub unit receiving data transfer request commands;
   plural ports each having a hub interface unit connected to said hub unit;
   plural application units;
   plural application interface units, each connecting a hub interface unit and a corresponding application unit;
   wherein said hub unit maintains a queue of data transfer request commands transferring data transfer commands to corresponding application interface units according to a priority protocol; and
   wherein at least one port having
      a data transfer command queue receiving data transfer commands from said hub unit and storing received data transfer commands in an order of receipt from said hub unit, and
      a command re-ordering unit presenting hub data transfer request commands to said corresponding application unit in different order than received from said hub unit.

2. The direct memory access apparatus of claim 1, wherein:
   said command re-ordering unit receives write commands having priority and write data from said hub, and supplies write commands and corresponding write data to said corresponding application unit in order of priority.

3. The direct memory access apparatus of claim 2, wherein:
   said command re-ordering unit includes a write command queue storing write commands and corresponding write data and a priority extractor re-ordering write commands in priority order upon receipt of each new write command.

4. The direct memory access apparatus of claim 2, wherein:
   said command re-ordering unit receives read commands having priority, supplies read commands to said application unit in order of priority and includes a read response queue storing returned read data and supplying said returned read data to said hub in a read command order of original receipt from said hub unit and wherein a write command has priority over a read command having a same priority level.

5. The direct memory access apparatus of claim 4, wherein:
   said command re-ordering unit includes a read command queue storing read commands and a priority extractor re-ordering read commands upon receipt of each new read command.

6. The direct memory access apparatus of claim 1, wherein:
   said command re-ordering unit receives read commands with priority, supplies read commands to said corresponding application unit in order of priority and includes a read response queue storing returned read data and supplying returned read data to said hub in a read command order of original receipt from said hub unit.

7. The direct memory access apparatus of claim 6, wherein:
   said command re-ordering unit includes a read command queue storing read commands and a priority extractor re-ordering read commands upon receipt of each new read command.

* * * * *